INVENTOR:
GEORGES R. E. LEZAN,
BY Albert S. Richardson Jr.
ATTORNEY

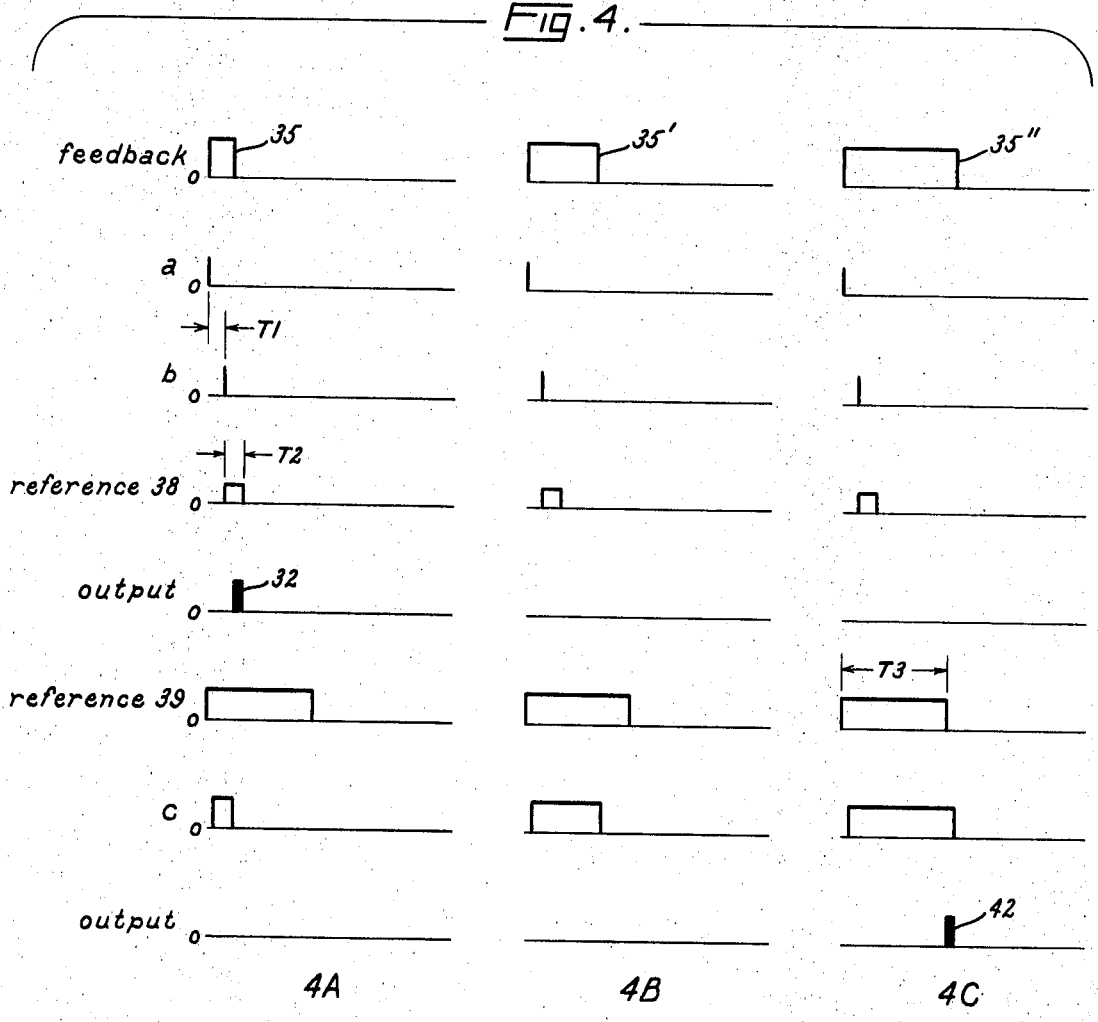

United States Patent Office 3,560,836
Patented Feb. 2, 1971

3,560,836
MEANS FOR PROTECTING ELECTRIC POWER CONVERTERS FROM COMMUTATION FAILURE
Georges R. E. Lezan, Cherry Hill, N.J., assignor to General Electric Company, a corporation of New York
Filed Jan. 3, 1969, Ser. No. 788,718
Int. Cl. H02m 1/08, 5/00
U.S. Cl. 321—7                                                                                                 8 Claims

ABSTRACT OF THE DISCLOSURE

In this improved circuit for protecting electric power converters from commutation failure, suitable means is provided for directly detecting the actual margin of an electric power converter and for comparing the detected angle with a given reference in order to initiate margin angle increasing measures if the detected angle is undersize.

---

This invention relates generally to electric power conversion apparatus of a class known as frequency changers, and more particularly it relates to improvements in a frequency multiplier of the synchronous, solid-state switching type supplying electric energy to a tank circuit whose reactance is subject to change.

The use of synchronous switching type converters for multiplying the frequency of commercially available power is old and well known in the art. The switching components employed in such converters are generally referred to as electric valves and may specifically comprise magnetic elements (e.g., saturable reactors) or electronic elements (e.g., ignitrons, thyratrons, or the presently preferred solid-state thyristors). By properly arranging and controlling at least one set of six valves that are cyclically operated in a predetermined sequence, A-C electric power supplied from a three-phase source of sinusoidal voltage of fundamental frequency (e.g., 60 hertz) can be directly converted to single-phase power of an harmonic frequency (e.g., 180 hertz) for energizing a connected load.

In operation, each valve of the harmonic frequency multiplier has a non-conductive or blocking state, in which it presents very high impedance to the flow of load current, and a conductive or turned on state of negligible impedance, and the cyclically recurring moment of time at which it switches from the former state to the latter is determined by an associated control or trigger signal. The turn-on instant can be expressed in electrical degrees (known as the "firing angle") measured from the appropriate zero crossing of line-to-neutral voltage of the input phase to which the valve is connected. By advancing (decreasing) the firing angle from a fully retarded condition (approximately 180 degrees) to the vicinity of 60 degrees, the RMS magnitude of the third-harmonic output voltage can be increased from zero toward maximum.

Once turned on, a valve will continue conducting until "forward" current is subsequently extinguished by the action of the external circuit in which the valve is connected. This turn off process can be referred to as "commutation." In the case of electronic valves such as thyristors, successful switching from conducting to non-conductive states requires that reapplication of forward anode-to-cathode voltage be delayed after forward current reaches zero until the valve has had time to regain completely its blocking capability. The interval of time required for this purpose is generally known as "turn-off time," and to ensure reliable commutation the converter "margin angle" has to be at least as long.

The interval of time beginning at the moment that forward current in an outgoing (relieved) valve is reduced to zero and ending when the main electrodes of this valve are next subjected to forward voltage is herein referred to as the deionization or margin angle of the converter. This is the time actually available during each operating cycle for turning off a valve, and it equals the turn-off time of the valve plus any ensuing period of reverse voltage across the turned off device. If the margin angle were not sufficient to allow the outgoing valve to recover its ability to block forward voltage, this valve would prematurely resume conduction which event is herein called a commutation failure.

In practice the aforesaid frequency multiplying converter is ordinarily connected to a tank circuit whose inductance (L) typically comprises an induction heating coil, which is the load to be energized, and whose capacitance (C) is provided by a bank of capacitors connected in parallel circuit relationship with the coil. Under most operating conditions cyclic commutation of the respective valves in the converter will be favorably influence by load voltage if the current being supplied to the tank circuit leads voltage (a leading power factor) and will be adversely influenced if current lags voltage (a lagging power factor). The size of the margin angle and hence the ability to commutate is affected not only by power factor but also by the magnitude of load impedance and the particular firing angle desired. In the frequency multiplier herein contemplated, all of these vital parameters are variables, and their complex and dynamic interrelationships make it extremely difficult to program the converter in a manner that will always ensure successful commutation. For example, the load impedance that the heating coil imposes on the converter will vary in magnitude and phase from charge to charge and during the course of each heat. Consequently the power factor of the tank circuit can change appreciably in a lagging sense from an initially satisfactory value, and as a result the margin angle of the converter can shrink to a point where commutation fails. Even if a constant power factor were assumed, there is a possibility of running out of margin angle as the firing angle is advanced (i.e., as the delay angle is reduced) by the associated regulator attempting to increase the amount of voltage and/or current that the converter delivers to the load during a heating cycle.

In accordance with the teachings contained in a patent application S. N. 788,790 filed concurrently herewith for C. E. Rettig and assigned to the assignee of the present application, successful commutation can be ensured in spite of adverse changes in the magnitude and power factor of the load by utilizing a suitable mechanism for adding capacitance to the tank circuit and by providing protective means for actuating that mechanism whenever the frequency multiplying converter is operating with a margin angle under a predetermined size. As a result of the added capacitance, the Q of the tank circuit tends to increase, and the margin angle of the converter is beneficially extended. To obtain this result, the protective means may take the specific form first disclosed by Rettig. However, that form has certain practical shortcomings: its construction has been found to be somewhat temperamental, and in operation its response is not as consistent or precise as may be desired. Because of these factors, the predetermined margin angle at which the original protective means was designed to operate in one particular case exceeded the turn-off time of the valves by 200 percent. When a converter is required to operate with its minimum margin angle limited to such a relatively high level by the commutation-failure protective means, a significant amount of its power capability is undesirably sacrificed.

Accordingly, a general objective of the present invention is to provide improved protective means for ensuring successful commutation in a frequency multiplying converter without unduly compromising its power capability.

Another objective is to provide protective means which will enable a converter to operate safely with a margin angle that is only slightly (e.g., 20 percent or less) over the characteristic turn-off time of its slowest valve.

In carrying out the invention in one form, a frequency tripling converter of the synchronous, solid-state switching type is adapted to be connected to a tank circuit that includes a capacitor bank equipped with capacitor changing means for adding capacitance on command, and margin angle detection means is connected to the converter for deriving a feedback signal representing its actual margin angle. In addition, I provide means connected to the detection means for producing a command signal when the aforesaid feedback signal indicates that the actual margin angle is smaller than a predetermined safe minimum, and the capacitor changing means is arranged to add capacitance when actauted by this command signal.

The specific protective means summarized in the preceding paragraph is inherently so consistent and precise that the aforesaid predetermined safe minimum margin angle can be set at a level that exceeds the turn-off time of the valves of the converter by only 10 or 20 percent. This relatively low minimum margin angle enables the converter to operate successfully with a more advanced firing angle than was heretofore possible, thereby advantageously increasing the amount of power delivered to the load. Because of the reduced margin of safety, the protective means in one embodiment of the invention is also arranged to suppress temporarily the trigger signals for the respective valves in the converter at the same time the aforesaid command signal is being produced, thereby immediately shutting down the converter and avoiding a commutation failure which might otherwise occur before capacitance can be added or the trigger signals retarded.

The invention will be better understood and its various objects and advantages will be more fully appreciated from the following description taken in conjunction with the accompanying drawings in which:

FIGS. 4A, 4B, and 4C are time charts of certain signals present in FIG. 3 under three different margin angle conditions.

Figure 1:
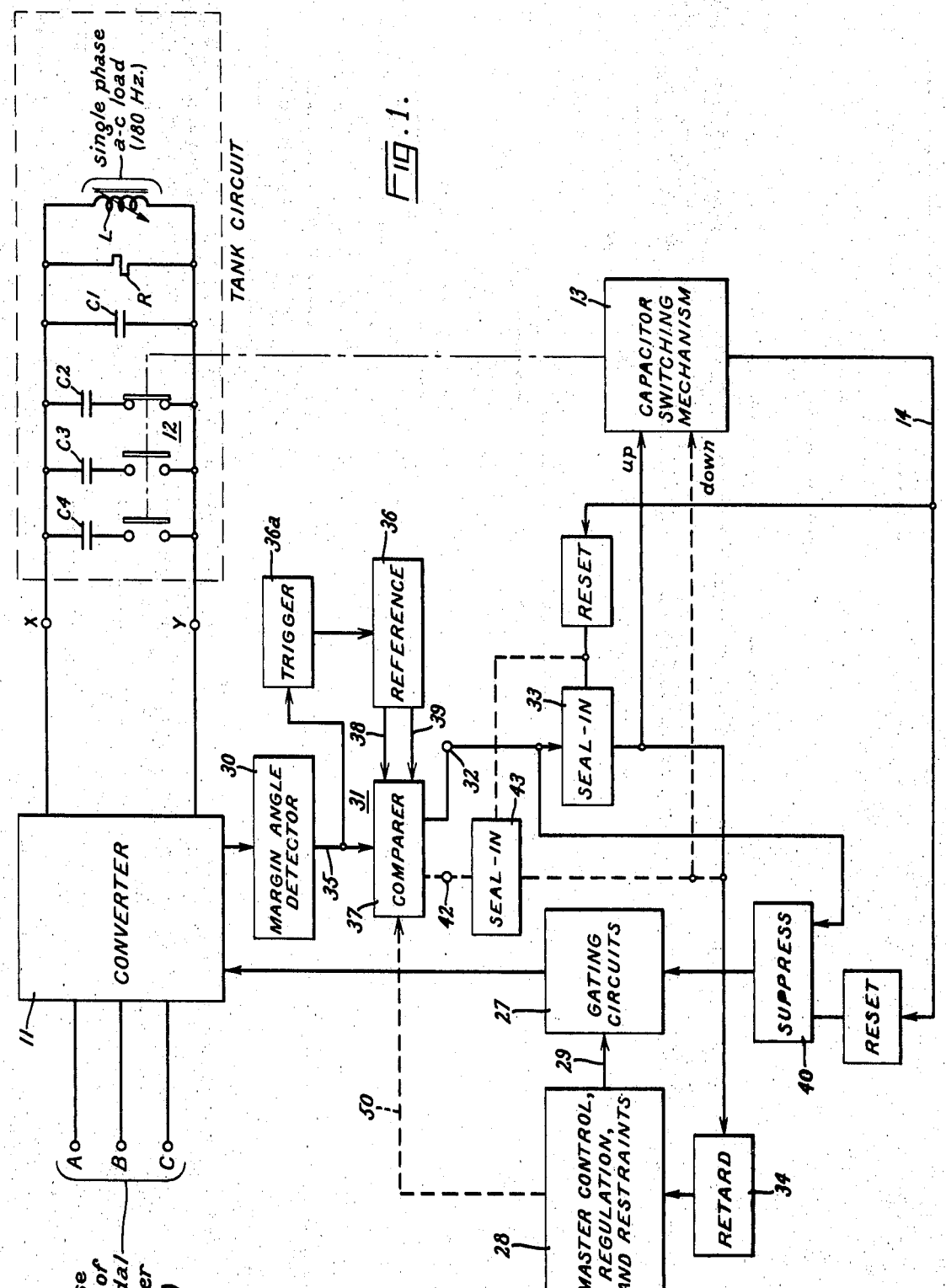
FIG. 1 is a schematic block diagram of electric power conversion apparatus embodying my improved protective means.

Referring now to FIG. 1, there is shown for purposes of illustration an electric power converter 11 connected between a set of three input terminals A, B, C and a pair of output terminals X, Y. The input terminals A, B, C are intended to be energized by sinusoidal voltage of fundamental frequency (e.g., 60 hertz) supplied by a commercial source of 3-phase A-C electric power. The output terminals X, Y are shown connected to a tank circuit that includes a single-phase A-C load, represented symbolically by a resistor R in parallel with an inductor L, and a parallel bank of capacitors of assorted sizes C1, C2, C3, C4, etc. The load is actually an induction heating coil or the like, and therefore it has been depicted as having a variable value of inductance L.

The capacitor bank is equipped with capacitor changing means comprising a plurality of contacts 12 that are selectively actuated by an associated capacitor switching mechanism 13. Operation of the capacitor changing means will in effect vary the value of capacitance C shunting the inductance L in the tank circuit. In practice a motor driven rotary cam switch or an assembly of electromechanical stepping switches can be used for this purpose. The details of the mechanism 13 are not shown since they are not critical to an understanding of the present invention, it being sufficient to note that the contacts 12 are appropriately manipulated to add an increment of capacitance on receipt of an "up" command and to subtract an increment of capacitance on receipt of a "down" command. It should also be noted that at the conclusion of each capacitor changing step the mechanism 13 issues an appropriate momentary signal 14 to mark this event.

Figure 2:
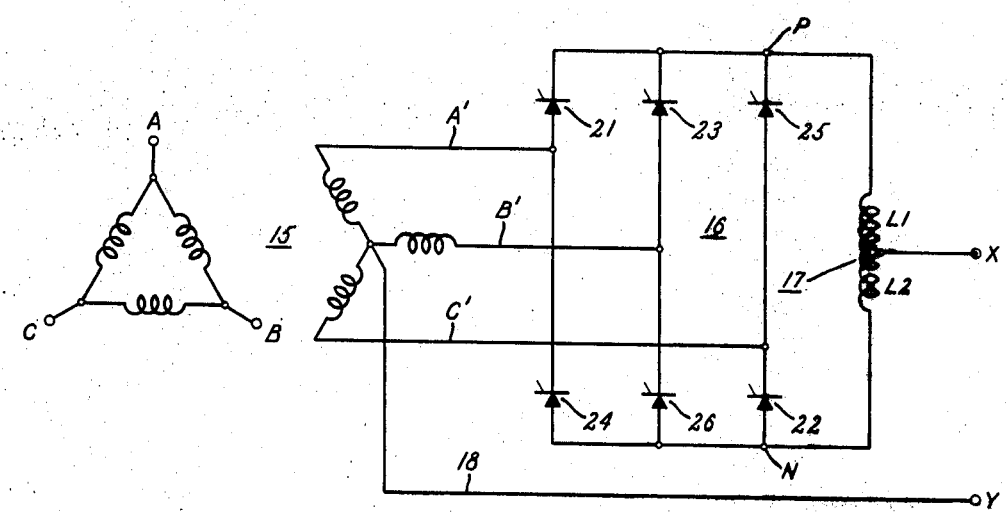
FIG. 2 is a schematic circuit diagram of the converter shown as a single block in FIG. 1.

The converter 11 preferably is of the synchronous, solid-state switching type and is designed to energize the induction heating coil in the tank circuit with alternating current of a predetermined (e.g., third) harmonic frequency (i.e., 180 hertz). FIG. 2 shows in simplified form the power circuit of one such converter.

The illustrated converter is a frequency tripler, and it is seen to comprise a 3-phase power transformer 15, a group 16 of six load-current conducting electric valves, and a spanning reactor 17. The primary windings of the transformer 15 are connected in a delta configuration across the separate input terminals A, B, and C of the power conversion apparatus. The corresponding secondary windings are arranged in a star configuration, with their common terminals being coupled to the lower output terminal Y via a neutral conductor 18 or equivalent. The other terminals of the three phases of the transformer secondary are connected to the lines A', B', and C', respectively, and a conventional phase rotation A'–B'–C' is assumed.

The respective valves of the group 16 are numbered 21 through 26. These valves preferably comprise semiconductor controlled rectifiers (generally known as thyristors), and as is shown in FIG. 2 they are interconnected to form a 3-phase bridge circuit whose A-C terminals are respectively connected to the lines A', B', C' and whose D-C terminals P and N are preferably spanned by the reactor 17. The reactor 17 is divided into two mutually coupled halves L1 and L2, and the upper output terminal X is connected directly to a center point thereof.

By supplying the respective control electrodes (gates) of the six valves 21–26 with an appropriately timed family of cyclically generated control or trigger signals, the valves are turned on in numerical sequence in synchronism with the 3-phase input voltage, and consequently a single-phase alternating voltage of third harmonic frequency (180 hertz) is developed across the output terminals X, Y. Each of the valves 21–26 remains in its turned-on state for approximately one-sixth or less of a whole cycle of the input voltage, and during each conducting interval a different input phase is in turn connected to the output terminals according to the following table:

| Conducting valve: | Phase |
|---|---|
| 21 | A'+ |
| 22 | C'– |
| 23 | B'+ |
| 24 | A'– |
| 25 | C'+ |
| 26 | B'– |

Means for cyclically generating the requisite trigger signals is shown in FIG. 1 as a block 27 labelled "gating circuits." The gating circuits can be of any suitable design for producing, in synchronism with the A-C input voltage, a succession of trigger signals for cyclically firing the valves 21–26 of the converter 11 in numerical order. A circuit advantageously used in practice is disclosed in my U.S. Pat. No. 3,095,513. The timing of the family of trigger signals is determined by associated master control, regulation and restraint circuitry which in FIG. 1 have been lumped together in a single block 28 for the sake of drawing simplicity. This block includes conventional voltage regulating means with current limit override for supplying the gating circuits 27 with an error signal 29 of adjustable value. The firing angle of the periodic trigger signals generated by the gating circuits 27 will depend on the value of the error signal 29.

So long as the trigger signals for the respective valves of the bridge 16 shown in FIG. 2 are characterized by a firing angle in the range between approximately 60° and 180°, the operating mode of the frequency tripling converter is "discontinuous" and the valves will conduct load current, in turn, for intervals shorter than 60 electrical degrees. By advancing the firing angle to the vicinity of 60° or less, the respective conducting intervals are extended to 60° or longer, thereby obtaining a "continuous" mode of operation. The spanning reactor 17 permits any consequent overlapping of conductor between an odd-numbered and an even-numbered valve. This reactor also serves the advantageous purposes of limiting inrush current ($di/dt$) in each valve and of permitting parallel operation of other similar converters to increase the amount of power delivered to the load. Ordinarily the regulator 28, in attempting automatically to maximize the power delivered to the load, will call for the converter to operate in its "continuous" mode with the firing angle advanced as far as the built-in limits and restraints will permit.

In either the discontinuous or the continuous mode of operation, the actual margin angle of the illustrated converter must always exceed the characteristic turn-off time of the thyristors that are employed as the valves 21-26 to ensure successful commutation of the valves during each operating cycle. If a valve fails to commutate because of insufficient margin angle, that valve will conduct simultaneously with the next-conducting valve at a time when the input voltages are such as to circulate fault current of excessively high magnitude through the bridge 16. Correcting this condition requires operation of overcurrent protective means and results in undesirable interruptions of service.

As was explained above, the size of the converter margin angle depends on the interrelation of several variable factors, including principally the firing angle, the ohmic magnitude of the 180-hertz load to which the output terminals X, Y of the frequency tripler are connected, and the power factor of the load. In the power conversion apparatus as so far described, there is always a possibility that these parameters can combine in a way that results in a margin angle insufficient to sustain commutation. To protect against this possibility, Rettig suggested having the capacitor switching mechanism 13 add capacitance to the tank circuit whenever the converter 11 is operating with a margin angle under a predetermined minimum, thereby making the power factor of the load more leading and propitiously increasing the margin angle.

In accordance with the present invention and as indicated in FIG. 1, this desired result is accomplished by using improved protective means comprising, in combination: means for directly detecting the actual margin angle of the converter 11, and means 31 for developing an output pulse at a terminal 32 if and when the detected margin angle is smaller than the aforesaid minimum. The pulse at terminal 32 is used to activate seal-in means 33 which in turn transmits to the capacitor switching mechanism 13 a sustained "up" command signal. The up command signal expires when the seal-in unit 33 is reset by the signal 14 that is issued by the mechanism 13 at the conclusion of its capacitance switching operation.

As is illustrated in FIG. 1, the same command signal is used to activate an ancillary phase retard component 34 of the regulator 28 which consequently adjusts the error signal 29 in a sense and to a degree that fully retards the firing angle of the trigger signals generated by the gating circuits 27. In this way operation of the protective means causes the converter 11 to reduce to zero its output voltage, and the capacitor bank is de-energized during the switching of contacts 12. Preferably this result is accomplished by arranging the component 34 to remove temporarily the reference for the current limit override in the regulator 28, and the reference is designed to "ramp" on when the component 34 is released on expiration of the command signal. As a result, after a capacitance switching operation the firing angle of the converter 11 does not abruptly advance from its fully retarded condition, and the tank circuit is re-energized in an orderly fashion.

The above-mentioned margin angle detector 30 and command signal initiating means 31 will now be described in more detail. The detector 30 is suitably connected to the conversion apparatus 11 and is so constructed and arranged as to derive, during each operating cycle of the apparatus, a train of six "feedback" signals 35 whose respective durations reflect the actual margin angle of the converter when each of its six valves 21-26 is turned off in turn. To derive such feedback signals representing margin angle, the detector 30 can take any one of a variety of different forms, and a form that has been advantageously used in practicing my invention is disclosed and claimed in copending patent application Ser. No. 790,246 filed on Jan. 10, 1969, filed for F. W. Kelley and G. R. Lezan and assigned to the assignee of this application.

The feedback signals 35 from the margin angle detector 30 are fed to the means 31 which in FIG. 1 is seen to comprise a reference signal source 36 and a comparer 37. Associated with 36 is a trigger circuit 36a which activates the reference means at the beginning of each feedback signal. The purpose of the reference means 36 is to establish a reference signal 38 of a duration that reflects the aforesaid predetermined minimum margin angle. As will soon be apparent when FIG. 3 is described, the reference means 36 can also be arranged to establish a second reference signal 39 that is representative of a desired maximum margin angle, thereby defining the high side of a desired range of acceptable margin angles within which the converter 11 can advantageously operate.

By checking the feedback signals 35 against the respective reference signals 38 and 39 in the comparer 37, it can be determined whether the size of the actual margin angle is within or without the desired range, and if without, whether it differs therefrom in a low or a high sense. If the feedback signal becomes smaller than the minimum reference signal 38, the comparer 37 operates to produce an output pulse at the terminal 32, whereupon the up command signal is produced by the seal-in means 33. As is shown in FIG. 1, the terminal 32 is also coupled to the gating circuits via an ancillary component 40 which is suitably arranged to suppress the trigger signals for the concerter 11 immediately upon operation of the comparer 37. This function is desirable in practicing my invention where the minimum safe margin angle is so close to the turn-off time of the valves that commutation might otherwise fail between the time that an insufficient margin angle is detected and the time that the firing angle retarding action of the component 34 can take effect. The trigger signal generator 37 is subsequently released when the suppression component 40 is reset by the signal 14 issued by the mechanism 13 at the end of a capacitor switching operation.

As was noted above, the comparer 37 is optionally arranged for operation in response to the feedback signal 35 becoming greater than the maximum reference signal 39. In this case an output pulse is produced at the terminal 42, and this pulse activates seal-in means 43 which in turn produces for the mechanism 13 a "down" command signal which is sustained until the seal-in means 43 is reset by the signal 14. As was previously explained, the capacitor switching mechanism 13 is arranged to manipulate the contacts 12 so as to subtract an increment of capacitance from the tank circuit when actuated by the down command, and the firing angle of the converter 11 is fully retarded during this switching process.

Figure 3:
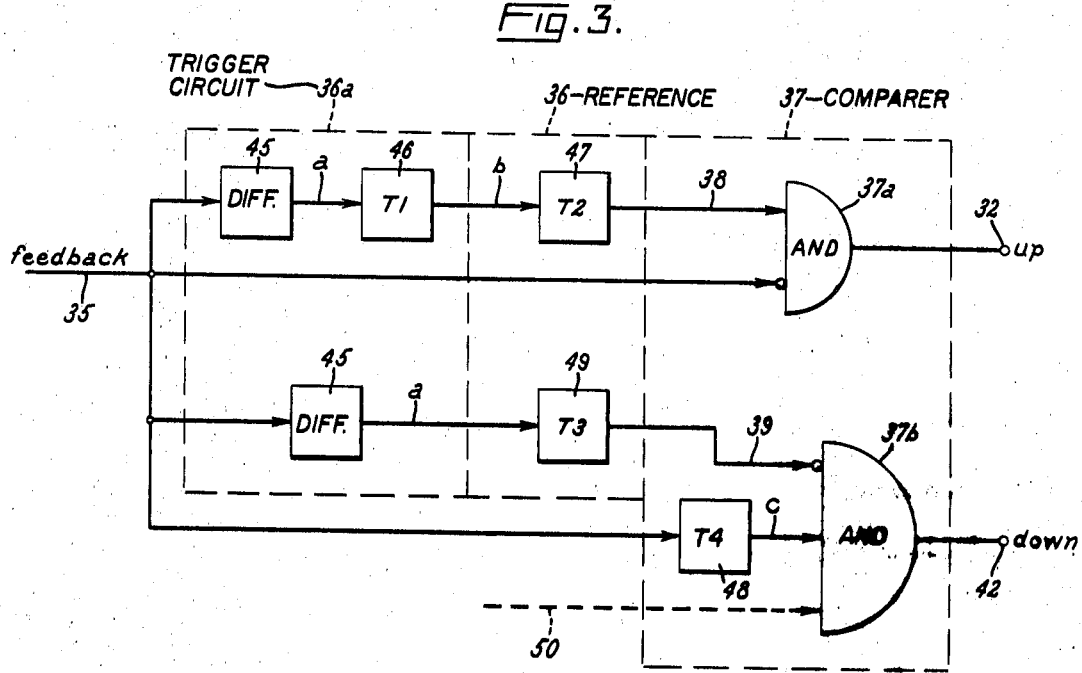
FIG. 3 is a schematic logic diagram of the trigger, reference, and comparer blocks shown in FIG. 1.

A logic diagram revealing more details of the command signal initiating means 31 is shown in FIG. 3. The illustrated circuits include channels for responding to both under and over margin angle conditions. For responding to a margin angle under a predetermined safe minimum, the feedback signals 35 are fed concurrently to a differentiating circuit 45 in the trigger 36a and to a "not" input of comparison means 37a, shown symbolically as an AND logic element. The differentiating circuit 45 is designed to produce a momentary trigger signal a at the beginning of each feedback signal 35. The circuit 45 is connected to time reference means 47 via a time delay circuit 46 which requires a preset interval T1 to pass a delayed trigger signal b to 47. The purpose of this initial delay is to prevent false operation of the comparison means 37a when each feedback signal 35 first appears. The time reference means 47 comprises a monostable multivibrator or the like, and it is designed to produce the minimum reference signal 38 for a preset constant interval T2 following activation by the delayed trigger signal b. The sum of the intervals T1 and T2 is the time base of the reference means 36 and represents the desired minimum margin angle (e.g., 500 microseconds). The reference signal 38 energizes the comparison means 37a which consequently produces an output pulse 32 unless simultaneously disabled by a feedback signal 35 at its not input.

In other words, the output pulse of the comparison means 37a is produced immediately following termination of a feedback signal 35 if a reference signal 38 is then present, which condition obtains only if the size of the actual margin angle is smaller than $T1+T2$. This is best seen in FIG. 4A which illustrates the time relationships of the various signals described above for a feedback signal 35 whose duration represents an actual margin angle that is under the predetermined minimum size. (Actually the signal 35 is but one of a series of periodic signals in the train derived by the margin angle detector 30.) It will be apparent in FIG. 4A that for the assumed margin angle the output pulse at terminal 32 corresponds in time to the period when the reference signal 38 is present and the feedback signal 35 is absent. If the margin angle were greater than the sum of T1 and T2, as is the case in FIGS. 4B and 4C, there is no output pulse 32.

For responding to a margin angle over a predetermined desired maximum, the feedback signals 35 are also fed to another differentiating circuit 45 and, as is shown in FIG. 3, to a short time delay circuit 48 associated with comparison means 37b. The momentary trigger signal a produced by circuit 45 at the beginning of each feedback signal 35 is used to activate time reference means 49 which then produces for a preset constant interval T3 the maximum reference signal 39. For this purpose the time reference means 49 comprises a monostable multivibrator or the like, and its operating interval T3 represents the desired maximum margin angle (e.g., 1,500 microseconds). The reference signal 39 is fed to a "not" input of the illustrated comparison means 37b which is shown symbolically as an AND logic element. A short time T4 (e.g., 20 microseconds) after the start of each feedback signal 35, the delay circuit 48 passes to the comparison means 37b an energizing signal c which subsists until the end of the feedback signal. While the energizing signal C subsists, the comparison means 37b is operative to produce an output pulse at terminal 42 unless simultaneously disabled by a reference signal 39 at its not input. The purpose of the short delay introduced by circuit 48 is to prevent false operation of the comparison means 37b when a feedback signal 35 first appears.

It will now be apparent that the output pulse of the comparison means 37b is produced only if the size of the actual margin angle is greater than T3. This is best seen in FIG. 4C which illustrates the time relationships of the various signals described above for a feedback signal 35" whose duration represents an actual margin angle over the predetermined maximum size. It will be apparent that the output pulse at terminal 42 corresponds in time to the period when the feedback signal 35" is present and the reference signal 39 is absent. If the margin angle were smaller than T3, as is the case in FIGS. 4A and 4B, there is not output pulse 42.

In FIG. 3 a third input signal 50 is shown for the comparison means 37b. Preferably the regulator 28 provides this input signal whenever the firing angle of the trigger signals for the converter 11 is not being advanced, as indicated, for example, by its current reference signal being quiescent (but not zero). However, there is no signal 50 when the regulator 28 is in the process of advancing the firing angle, and consequently the comparison means 37b is then disabled from producing an output pulse, whereby no down command signal can be initiated to subtract capacitance at a time when the tank circuit is being reenergized following a capacitance adding step.

While I have shown and described in detail one form of my invention by way of illustration, many modifications will undoubtedly occur to those skilled in the art. Therefore I intend herein to cover all such modifications as fall within the true spirit and scope of my invention.

What I claim as new and desire to secure by Letters Patent of the United States is:

1. For protecting electric power conversion apparatus comprising a plurality of load-current conducting electric valves connected between a set of A-C source terminals and a set of A-C load terminals, means for cyclically generating a family of control signals for turning on the respective valves in a predetermined sequence so as to supply the connected load with alternating voltage of predetermined frequency, and means for increasing the margin angle of said apparatus when actuated, the improvement comprising:
   (a) margin angle detection means connected to said apparatus for deriving a feedback signal representing the actual margin angle of said apparatus;
   (b) reference means connected to said detection means for establishing a reference signal representing a predetermined minimum margin angle;
   (c) comparison means connected to said detection means and to said reference means and operative to produce an output pulse in response to said feedback signal becoming smaller than said reference signal; and
   (d) means coupling said comparison means to said margin angle increasing means for actuating the latter in response to operation of the former.

2. The improvement of claim 1 in which there is additionally provided means coupling said comparison means to said control signal generating means for temporarily suppressing said control signals immediately upon operation of the said comparison means.

3. The improvement of claim 1 wherein said comparison means is so constructed and arranged that its output pulse is produced whenever said reference signal is present immediately following termination of said feedback signal.

4. Improved protective means for electric power conversion apparatus having a set of input terminals adapted to be connected to a polyphase source of sinusoidal voltage of fundamental frequency, a pair of output terminals adapted to be connected to a tank circuit including an induction heating coil and a capacitor bank equipped with capacitor changing means for adding or subtracting capacitance on command, means including a plurality of load-current conducting electric valves for interconnecting said input and output terminals, said valves being cyclically turned on in a proper sequence to supply the tank circuit with alternating current having a frequency which is a predetermined multiple of said fundamental frequency, and control means for determining the characteristic firing angle at which said valves turn on, wherein the improvement comprises:
(a) margin angle detection means connected to said apparatus for deriving a feedback signal representing the actual margin angle of said apparatus; and
(b) means connected to said detection means for producing a command signal when said feedback signal indicates that said actual margin angle is without a desired range of margin angles;
(c) said capacitor changing means being actuated by said command signal to change capacitance in a sense tending to restore the margin angle to within said desired range.

5. The protective means of claim 4 wherein said command signal producing means includes means (i) reference means connected to said detection means for establishing a reference signal representing a predetermined desired margin angle and (ii) comparison means connected to said detection means and to said reference means and operative when said feedback signal differs in a predetermined sense from said reference signal, said command signal being produced in response to operation of said comparison means.

6. The protective means of claim 5 in which said predetermined desired margin angle is a minimum and said comparison means is arranged to operate when said feedback signal is smaller than said reference signal, said capacitor changing means being actuated by the resulting command signal to add capacitance to said tank circuit.

7. The protective means of claim 5 in which said predetermined desired margin angle is a maximum and said comparison means is arranged to operate when said feedback signal is greater than said reference signal, said capacitor changing means being actuated by the resulting command signal to subtract capacitance from said tank circuit.

8. The protective means of claim 7 in which means is provided for disabling said comparison means whenever said control means is in the process of advancing said firing angle.

References Cited
UNITED STATES PATENTS

| | | | |
|---|---|---|---|
| 2,587,151 | 2/1952 | Hansen | 321—7 |
| 3,300,712 | 1/1967 | Segsworth | 323—105 |
| 3,474,321 | 10/1969 | Ainsworth | 321—5 |

WILLIAM H. BEHA, Jr., Primary Examiner

U.S. Cl. X.R.

219—10.77; 321—66; 323—105